(12) United States Patent
Scheifele

(10) Patent No.: US 12,103,335 B2
(45) Date of Patent: Oct. 1, 2024

(54) TIRE HAVING A MODULAR TREAD

(71) Applicant: Bridgestone Americas Tire Operations, LLC, Nashville, TN (US)

(72) Inventor: Kevin E. Scheifele, Atwater, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 341 days.

(21) Appl. No.: 17/612,643

(22) PCT Filed: May 26, 2020

(86) PCT No.: PCT/US2020/034524
§ 371 (c)(1),
(2) Date: Nov. 19, 2021

(87) PCT Pub. No.: WO2020/256895
PCT Pub. Date: Dec. 24, 2020

(65) Prior Publication Data
US 2022/0234391 A1    Jul. 28, 2022

Related U.S. Application Data

(60) Provisional application No. 62/864,166, filed on Jun. 20, 2019.

(51) Int. Cl.
*B60C 7/00*    (2006.01)
*B60C 7/10*    (2006.01)
(Continued)

(52) U.S. Cl.
CPC .............. *B60C 11/02* (2013.01); *B60C 7/107* (2021.08); *B60C 7/146* (2021.08);
(Continued)

(58) Field of Classification Search
CPC .. B60C 7/10; B60C 7/102; B60C 7/14; B60C 7/146; B60C 7/18
See application file for complete search history.

(56) References Cited

U.S. PATENT DOCUMENTS 2,620,845 A    12/1952    Lord
4,226,273 A    10/1980    Long et al.
(Continued)

FOREIGN PATENT DOCUMENTS

CN    104755278    7/2015
CN    107031289    8/2017
(Continued)

OTHER PUBLICATIONS

Supplementary European Search Report; Corresponding EP Application No. 20827783; Dated May 31, 2023.
(Continued)

*Primary Examiner* — Justin R Fischer
(74) *Attorney, Agent, or Firm* — Shaun J. Fox; Bryan J. Jaketic

(57) ABSTRACT

A modular non-pneumatic tire includes a first annular tire module and a second annular tire module coaxial with the first annular tire module. The first annular tire module includes a first inner ring, a first outer ring coaxial with the first inner ring, first support structure extending between the first inner ring and the first outer ring, and a first circumferential tread extending about the first outer ring. The second annular tire module includes a second inner ring, a second outer ring coaxial with the second inner ring, second support structure extending between the second inner ring and the second outer ring, and a second circumferential tread extending about the second outer ring. The first and second circumferential treads are asymmetrical. The first circumferential tread has a first orientation and the second circumferential tread has a second orientation that is different from the first orientation.

14 Claims, 13 Drawing Sheets

(51) Int. Cl.
  *B60C 7/14* (2006.01)
  *B60C 11/02* (2006.01)
  *B60C 11/03* (2006.01)
  *B60C 11/12* (2006.01)

(52) U.S. Cl.
  CPC ...... *B60C 11/0306* (2013.01); *B60C 11/1204* (2013.01); *B60C 11/1236* (2013.01); *B60C 2011/0346* (2013.01); *B60C 2011/1213* (2013.01)

(56) References Cited

U.S. PATENT DOCUMENTS

| | | | |
|---|---|---|---|
| 4,287,927 A | 9/1981 | Caravito et al. | |
| 5,676,900 A | 10/1997 | Pajtas | |
| 7,950,428 B2 * | 5/2011 | Hanada | B60C 7/102 152/326 |
| 2009/0211677 A1 | 8/2009 | Palinkas et al. | |
| 2010/0084910 A1 | 4/2010 | Botes et al. | |
| 2015/0273946 A1 | 10/2015 | Abe et al. | |
| 2017/0113489 A1 | 4/2017 | Iwamura et al. | |
| 2018/0170107 A1 | 6/2018 | Costlow | |
| 2018/0354216 A1 | 12/2018 | Haidet | |

FOREIGN PATENT DOCUMENTS

| | | |
|---|---|---|
| EP | 0297628 | 1/1989 |
| JP | 2008-055928 | 3/2008 |
| JP | 2009234361 A | 10/2009 |
| JP | 2013112045 | 6/2013 |
| JP | 2014091453 A | 5/2014 |
| JP | 2017-071249 | 4/2017 |
| JP | 2017081281 A | 5/2017 |
| JP | 2018039479 | 3/2018 |

OTHER PUBLICATIONS

Search Report and Written Opinion; Corresponding PCT Application Serial No. PCT/US2020/034524 filed May 25, 2020; Authorized Officer Hwang, Chan Yoon; Dated Sep. 8, 2020.

* cited by examiner

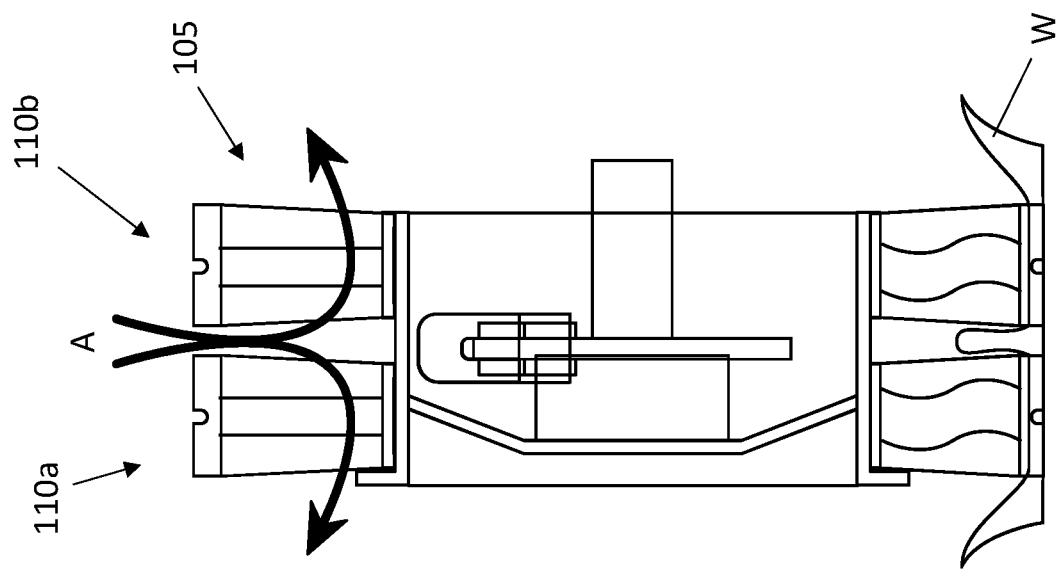
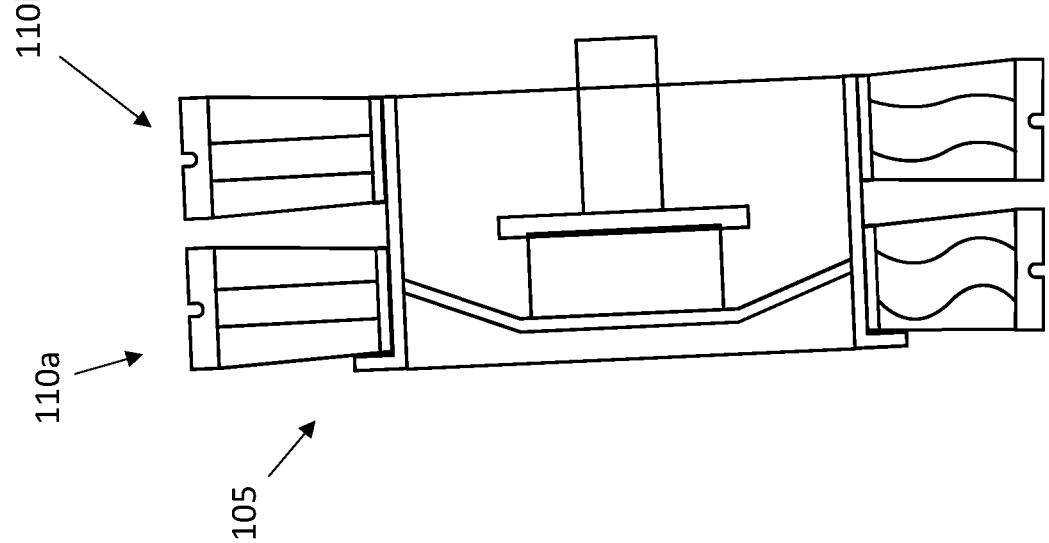

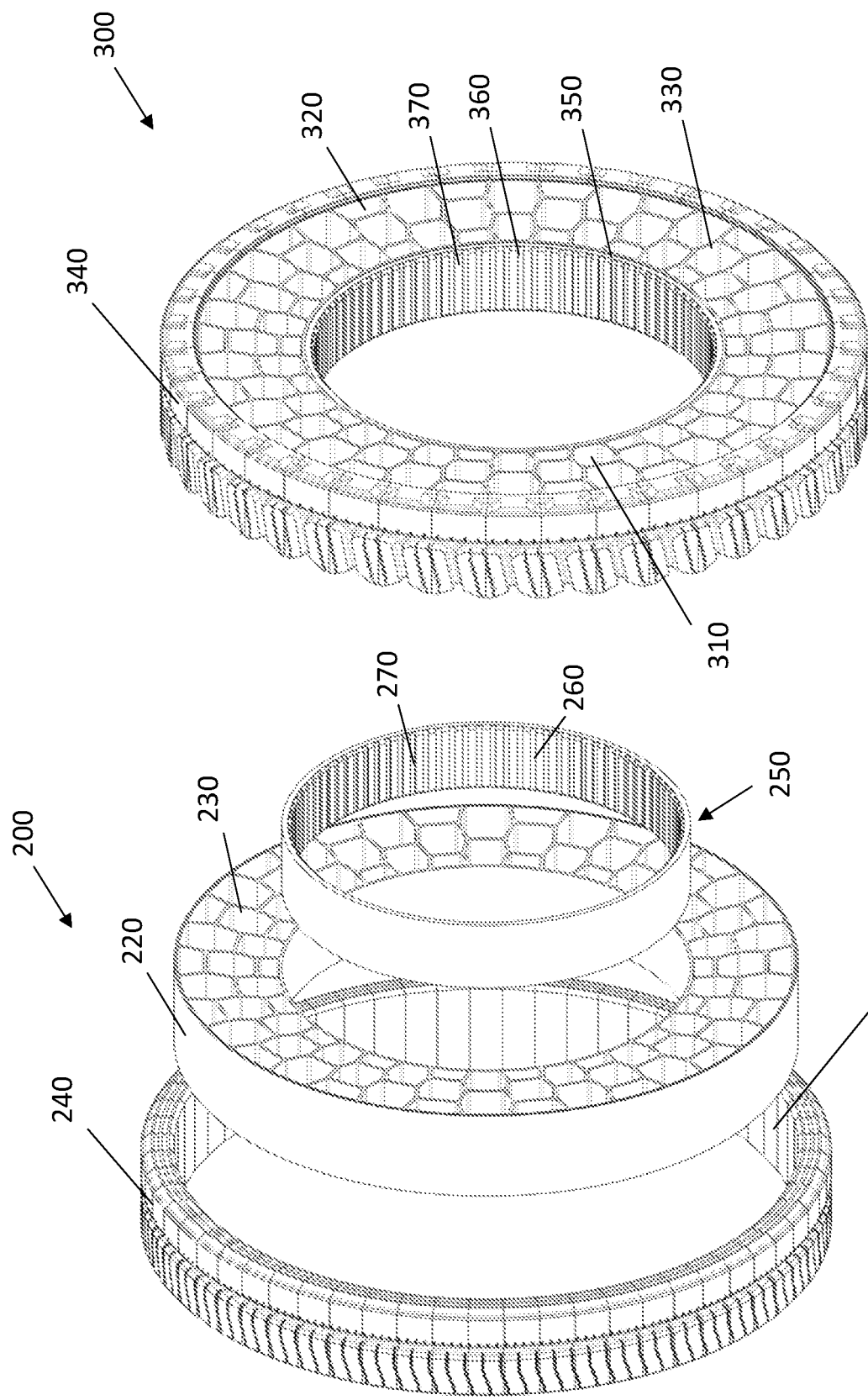

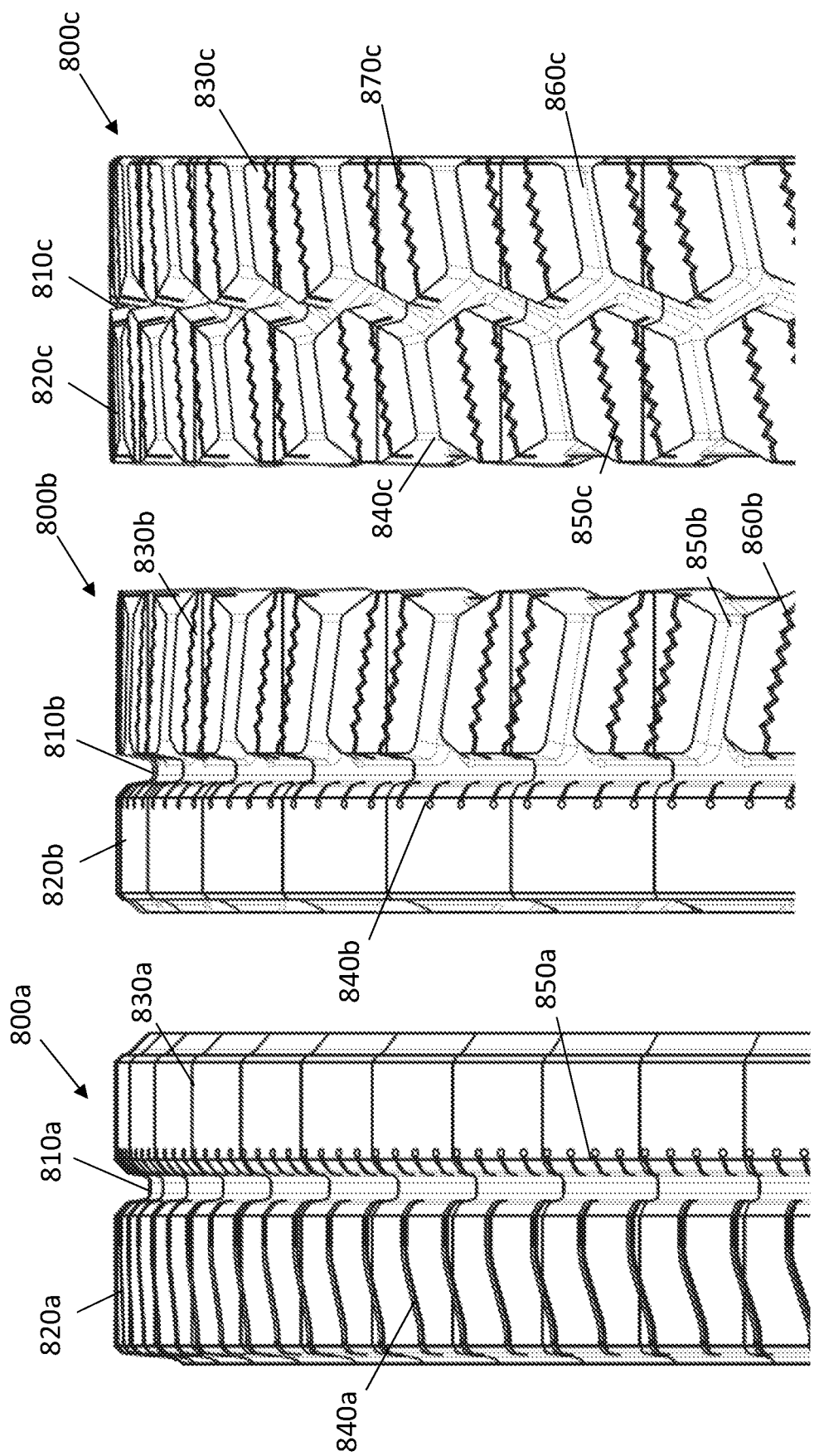

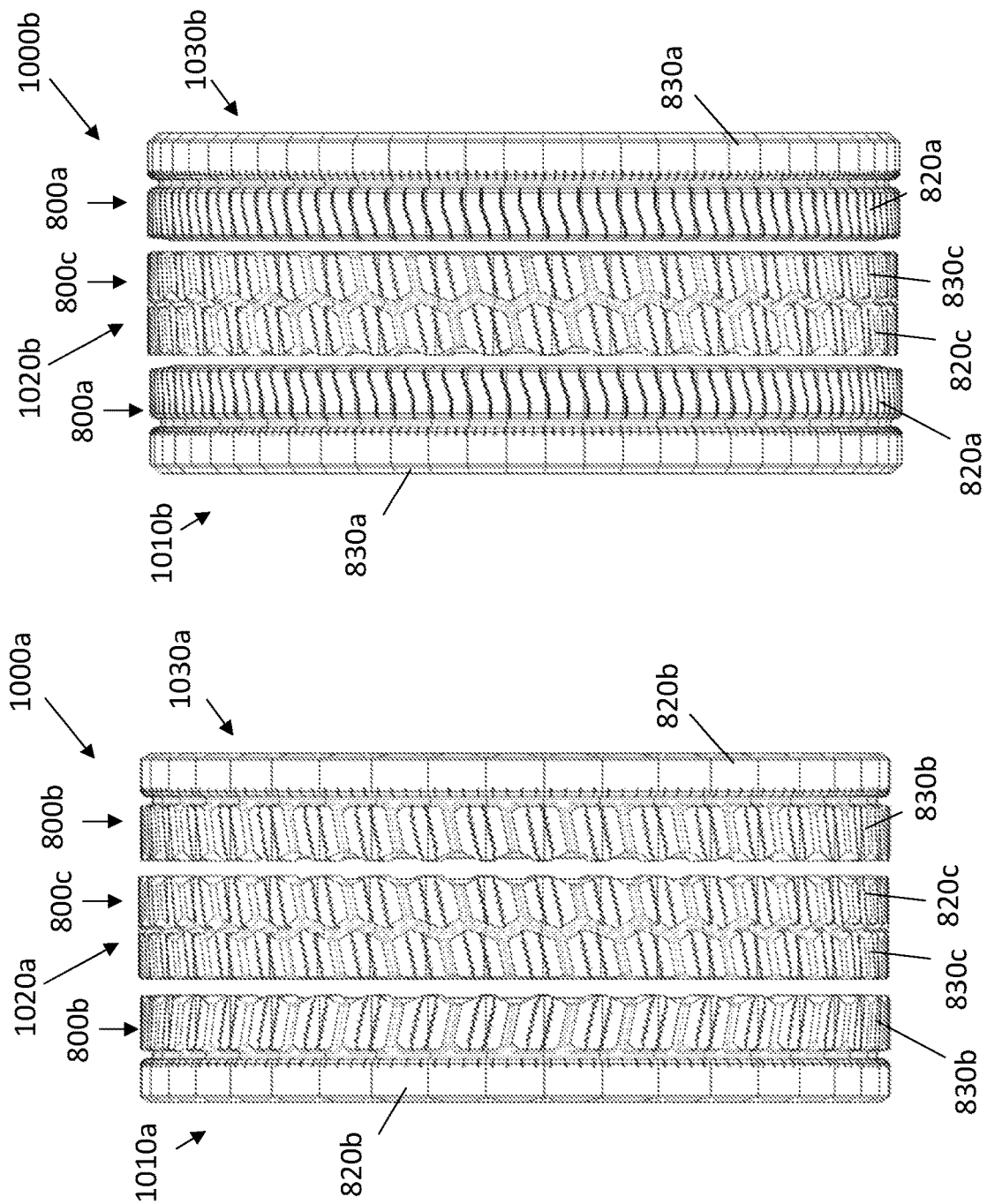

TIRE HAVING A MODULAR TREAD

FIELD OF INVENTION

The present disclosure relates to a tire and rim assembly for a tire, with a tire having multiple components. More particularly, the present disclosure relates to a tire and rim assembly for a non-pneumatic tire having modular components.

BACKGROUND

Various tire constructions have been developed which enable a tire to run in an uninflated or underinflated condition. Non-pneumatic tires do not require inflation, while "run flat tires" may continue to operate after receiving a puncture and a complete or partial loss of pressurized air, for extended periods of time and at relatively high speeds. Non-pneumatic tires may include a plurality of spokes, a webbing, or other support structure that connects an inner ring to an outer ring.

In current mounting methods, a non-pneumatic tire is mounted to a rim and affixed with adhesive, such that the rim it is difficult to remove the rim from the tire without causing damage to the rim or tire. If the rim is removed from the tire, it is difficult to remove any remaining adhesive from the rim. Thus, when the tire reaches its end of life, it may be resource intensive or expensive to recover the rim. As tires and tire designs become larger, the cost of the non-reusable rims will also increase.

SUMMARY OF THE INVENTION

In one embodiment, a non-pneumatic tire and rim assembly includes a non-pneumatic tire having a plurality of annular tire modules. The non-pneumatic tire has a first annular tire module coaxial with a second annular tire module. The first annular tire module includes a first inner ring, a first outer ring, first support structure extending between the first inner ring and the first outer ring, and a first circumferential tread extending about the first outer ring. The second annular tire module includes a second inner ring, a second outer ring, second support structure extending between the second inner ring and the second outer ring, and a second circumferential tread extending about the second outer ring. The first circumferential tread has a first tread pattern and the second circumferential tread has a second tread pattern that is different from the first tread pattern. The non-pneumatic tire and rim assembly also includes a rim having an outer annular surface that engages the first inner ring and the second inner ring.

In another embodiment, a method of assembling a tire and rim assembly, the method includes a step of providing a plurality of annular tire modules. Each annular tire module has an inner ring, an outer ring, support structure extending between the inner ring and the outer ring, and a circumferential tread extending about the outer ring. The method further includes steps of providing a rim, selecting a first annular tire module from the plurality of annular tire modules, and sliding the first annular tire module onto the rim. The method also includes steps of selecting a second annular tire module from the plurality of annular tire modules and sliding the second annular tire module onto the rim. The method further includes steps of providing a locking ring and sliding the locking ring onto the rim.

In yet another embodiment, a modular non-pneumatic tire includes a first annular tire module and a second annular tire module coaxial with the first annular tire module. The first annular tire module includes a first inner ring, a first outer ring coaxial with the first inner ring, first support structure extending between the first inner ring and the first outer ring, and a first circumferential tread extending about the first outer ring. The second annular tire module includes a second inner ring, a second outer ring coaxial with the second inner ring, second support structure extending between the second inner ring and the second outer ring, and a second circumferential tread extending about the second outer ring. The first and second circumferential treads are asymmetrical. The first circumferential tread has a first orientation and the second circumferential tread has a second orientation that is different from the first orientation.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

FIGS. 3A and 3B are schematic cross-sectional views of the non-pneumatic tire and rim assembly of FIG. 1;

FIG. 4A is an exploded perspective view of one embodiment of an annular tire module;

FIG. 4B is a perspective view of an alternative embodiment of an annular tire module;

FIGS. 8A-8C are partial front views of exemplary treads for annular tire modules;

FIGS. 10A-10C are front views of exemplary non-pneumatic tires having three annular tire modules.

DETAILED DESCRIPTION

Figure 1:
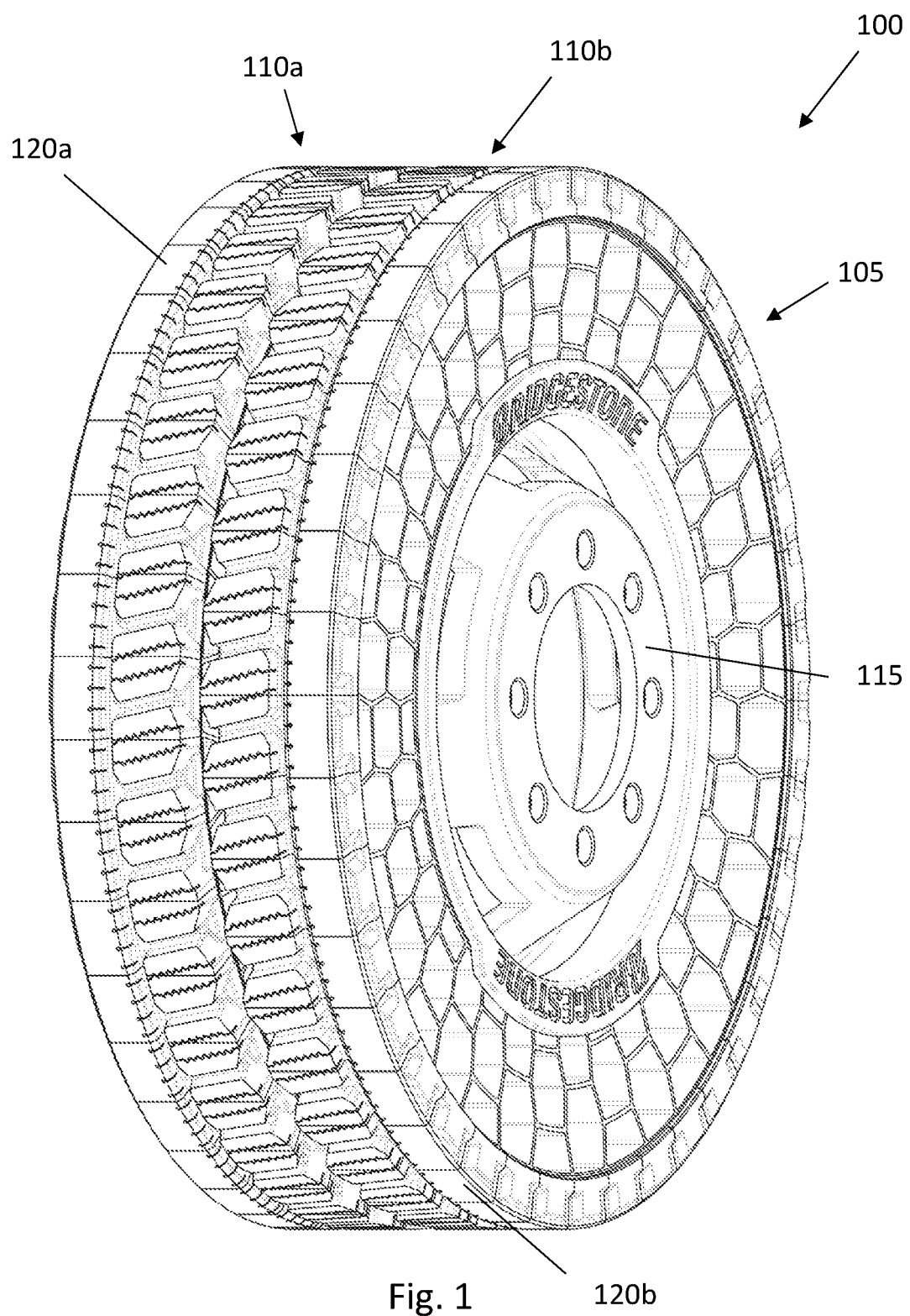
FIG. 1 is a perspective view of one embodiment of a non-pneumatic tire and rim assembly.
Figure 2:
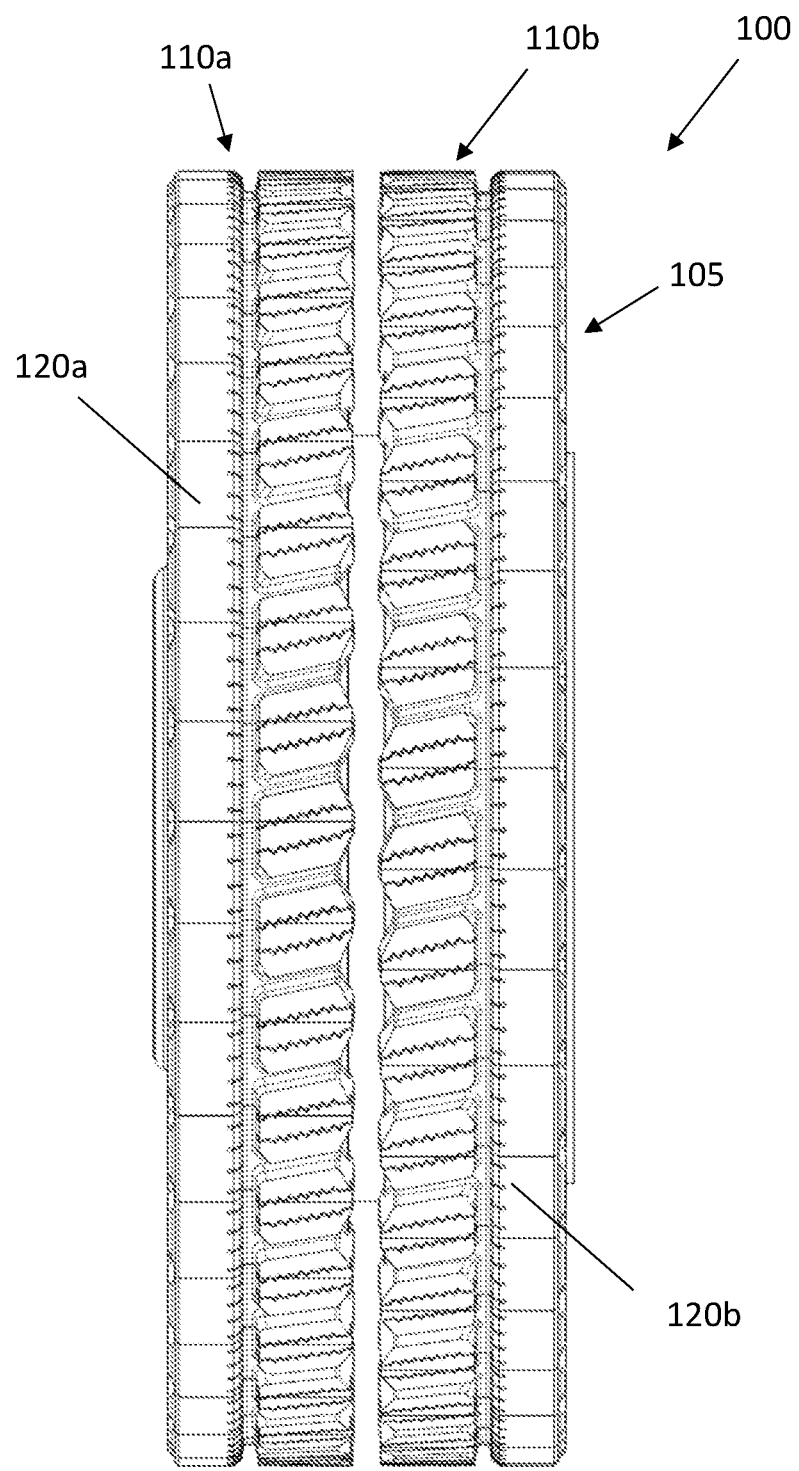
FIG. 2 is a front view of the non-pneumatic tire and rim assembly of FIG. 1.

FIGS. 1 and 2 provide a perspective view and front view, respectively, of one embodiment of a non-pneumatic tire and rim assembly 100. The assembly 100 includes a non-pneumatic tire 105 having a first annular tire module 110a that is coaxial with a second annular tire module 110b. The annular tire modules 110a,b are mounted on a rim 115. While two annular tire modules are shown in the illustrated embodiment, alternative embodiments may include three or more tire modules.

The first annular tire module 110a includes a first circumferential tread 120a and the second annular tire module 110b includes a second circumferential tread 120b. Each circumferential tread 120a,b includes a tread pattern composed of tread elements such as grooves, ribs, blocks, lugs, and sipes.

The tread patterns shown in the illustrated embodiment are merely exemplary. In the illustrated embodiment, the tread pattern of the first circumferential tread 120a is substantially the same as the tread pattern of the second circumferential tread 120b, and the treads are aligned in opposite orientations. In an alternative embodiment, the tread pattern of the first circumferential tread is substantially the same as the tread pattern of the second circumferential tread, and the treads are aligned in the same orientation. In another alternative embodiment, the first and second circumferential treads have different tread patterns.

In the illustrated embodiment, the first and second circumferential treads 120a, 120b have asymmetrical tread patterns. In an alternative embodiment, one or both of the first and second circumferential treads has a symmetrical tread pattern.

In the illustrated embodiment, the first annular tire module 110a is axially spaced apart from the second annular tire module 110b. In an alternative embodiment, the first annular tire module contacts the second annular tire module.

Spacing apart the annular tire modules may have several benefits, as illustrated in the schematic cross-sectional view of FIGS. 3A and 3B. Spacing apart the annular tire modules 110a,b reduces the mass of the tire 105, while maintaining wide footprint stability. Additionally, as shown in FIG. 3A, when the tire 105 is cornering, the outer forces on the first annular tire module 110a are isolated from the inner forces on the second annular tire module 110b, so that the first annular tire module 110a deflects by a different amount than the second annular tire module 110b. As shown in FIG. 3B, spacing apart the annular tire modules 110a,b allows for improved air flow A, resulting in improved cooling of the tire 105 as it rotates. Additionally, spacing apart the annular tire modules 110a,b result in higher contact pressure in the footprint of the tire, which reduces hydroplaning when the tire 105 contacts water W.

Additional details of the annular tire modules are shown in FIGS. 4A and 4B. FIG. 4A is an exploded perspective view of one embodiment of an annular tire module 200 and FIG. 4B is a perspective view of another embodiment of an annular tire module 300. Some details differ between the annular tire module 200 and the annular tire module 300. For example, the annular tire module 200 has a different tread pattern from the annular tire module 300. However, the basic components of the tire modules 200, 300 are substantially the same.

Each tire module 200, 300 includes an inner ring 210, 310, an outer ring 220, 320, and support structure 230, 330 extending between the inner ring 210, 310 and the outer ring 220, 320. In the illustrated embodiment, both the inner surface of the inner ring 210, 310 and the outer surface of the outer ring 220, 320 are smooth surfaces. In an alternative embodiment, one or more of these surfaces may include grooves, ribs, or other features.

In the illustrated embodiment, the support structure 230, 330 is a web. In an alternative embodiment (not shown), the support structure includes a plurality of spokes. In another alternative embodiment (not shown), the support structure is a solid structure.

In one embodiment, the inner ring 210, 310, outer ring 220, 320, and support structure 230, 330 are constructed of the same material. In an alternative embodiment, the inner ring 210, 310, outer ring 220, 320, and support structure 230, 330 are constructed of different materials. Exemplary materials include polymeric materials and metal. One or more of the inner ring 210, 310, outer ring 220, 320, and support structure 230, 330 may include reinforcements.

A circumferential tread 240, 340 extends about the outer ring 220, 320. The circumferential tread 240, 340 may include a shear element, such as a shear band. Alternatively, a shear layer may be disposed between the circumferential tread and the outer ring.

As explained above, the circumferential tread includes a tread pattern composed of tread elements such as grooves, ribs, blocks, lugs, and sipes. The circumferential tread 240, 340 may be affixed to the outer ring 220, 320 by an adhesive. Alternatively, the circumferential tread 240, 340 may be affixed to the outer ring 220, 320 by a bonding process, such as by curing. In an alternative embodiment, the separate circumferential tread is omitted and a tread pattern is instead formed directly in the outer ring.

In the illustrated embodiment, an inner hoop 250, 350 is affixed to the inner ring 210, 310. An inner surface of the inner hoop 250, 350 has a plurality of axial grooves 260, 360 that define a plurality of axial ridges 270, 370. The grooves 260, 360 and ridges 270, 370 may have a rectangular, trapezoidal, triangular, or rounded profile. Alternatively, the grooves and ridges may form any geometric shape. In one embodiment, each of the grooves 260, 360 has the same shape and each of the ridges 270, 370 has the same shape. In an alternative embodiment, the shapes may vary.

The inner hoop 250, 350 may be constructed of metal or a polymeric material. The inner hoop 250, 350 may also include reinforcements. In one embodiment, the an inner hoop 250, 350 is constructed of the same material as the inner ring 210, 310. In an alternative embodiment, the inner hoop 250, 350 and inner ring 210, 310 are constructed of different materials.

The inner hoop 250, 350 may be affixed to the inner ring 210, 310 by an adhesive. Alternatively, the inner hoop 250, 350 may be affixed to the inner ring 210, 310 by a bonding process, such as by curing. In an alternative embodiment, the separate inner hoop is omitted and axial grooves and ridges are instead formed directly on the inner surface of the inner ring.

Figure 5:
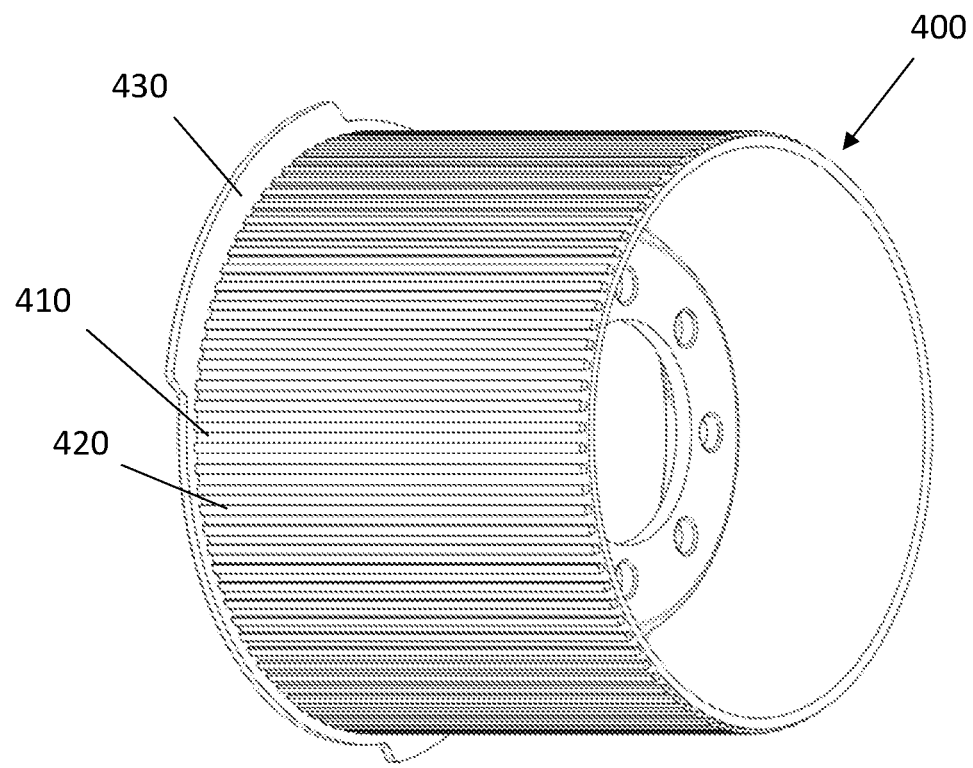
FIG. 5 is a perspective view of one embodiment of a rim.

FIG. 5 is a perspective view of one embodiment of a rim 400. The rim 115 of FIG. 1 may share the same features of the rim 400 of FIG. 5, or it may depart from the design in any of the manners discussed below.

The rim 400 has an outer annular surface configured to engage the inner surfaces of the annular tire modules. For example, the outer annular surface of the rim 400 may engage the inner surfaces of a first inner ring and a second inner ring, or the inner surfaces of a first inner hoop and a second inner hoop. In the illustrated embodiment, the outer annular surface of the rim 400 has a plurality of axial grooves 410 that define a plurality of axial ridges 420. The grooves 410 and ridges 420 may have a rectangular, trapezoidal, triangular, or rounded profile. Alternatively, the grooves and ridges may form any geometric shape. In one embodiment, each of the grooves 410 has the same shape and each of the ridges 420 has the same shape. In an alternative embodiment, the shapes may vary. In another alternative embodiment, the outer annular surface of the rim assembly is a smooth surface. In yet another alternative embodiment, the rim is perforated.

In the illustrated embodiment, the rim 400 has a flange 430 at a first axial end. The second axial end of the rim 400 has no flange. The diameter of the flange 420 varies around its circumference. In an alternative embodiment, the flange has a consistent diameter. In another alternative embodiment, neither end of the rim has a flange.

Figure 6:
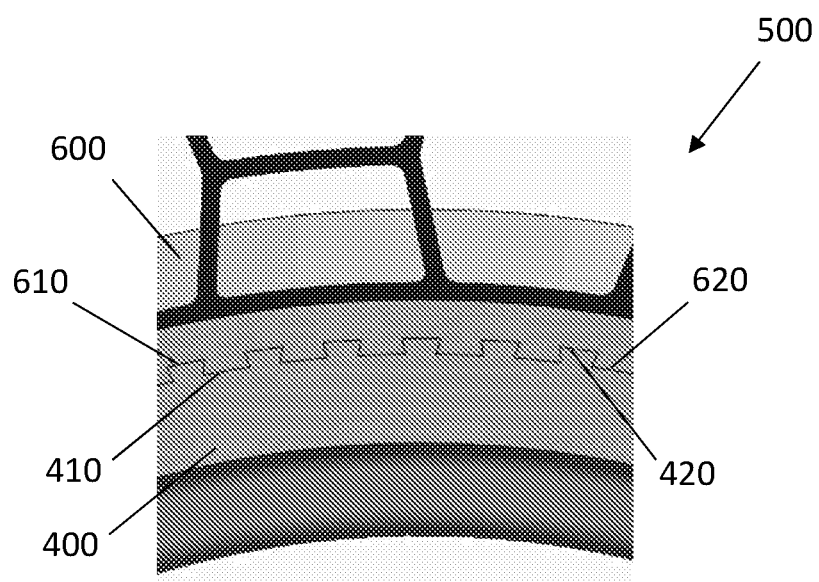
FIG. 6 is partial cross-section of one embodiment of a tire and rim assembly.

FIG. 6 is partial cross-section of one embodiment of a tire and rim assembly 500 including the rim 400 of FIG. 5, and an annular tire module 600. The annular tire module 600 may be substantially the same as one of the annular tire modules 110a, 110b, 200, 300 described above, or it may depart from those designs. The inner surface of the annular tire module 600 includes a plurality of axial grooves 610 that define a plurality of axial ridges 620.

As can be seen from this view, the shapes of the grooves 410 of the rim 400 correspond to the shapes of ridges 620 of the inner surface of the annular tire module 600. Likewise, the shapes of the ridges 420 of the rim 400 correspond to the shapes of grooves 610 on the inner surface of the annular tire module. Thus, the tire module 600 may slide onto the rim 400. Lubricant may be applied to one or more of the surfaces to assist in assembling the rim 400 and the annular tire module 600.

Figure 7:
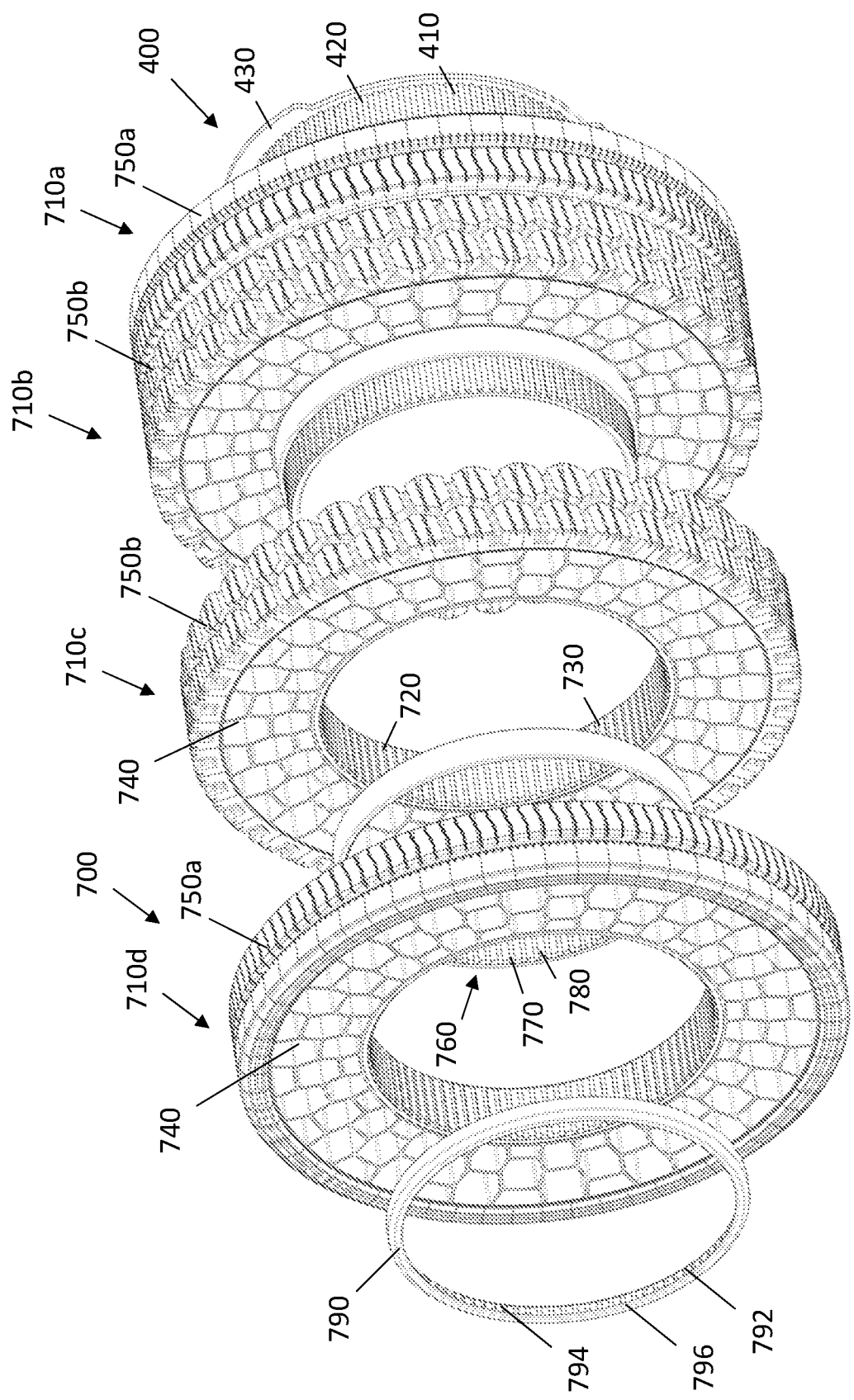
FIG. 7 is an exploded cutaway view of one embodiment of a tire and rim assembly.

Any number of annular tire modules may be placed onto the rim. For example, FIG. 7 is an exploded cutaway view of one embodiment of a tire and rim assembly 700 including the rim 400 and four annular tire modules 710a, 710b, 710c, 710d. Each of the annular tire modules 710a, 710b, 710c, 710d has an inner surface with grooves 720 and ridges 730 that correspond to the ridges 420 and grooves 410 of the rim 400 in the manner described above. The grooves 720 and ridges 730 of each of the annular tire modules 710a, 710b, 710c, 710d has substantially the same geometry as those of the other annular tire modules.

In the illustrated embodiment, each of the four annular tire modules 710a, 710b, 710c, 710d has substantially the same diameter, the same axial width, and substantially the same support structure 740. In alternative embodiments, one or more of the annular tire modules may have a different diameter. In another alternative embodiment, one or more of the annular tire modules may have a different axial width. In yet another alternative embodiment, one or more of the annular tire modules may have a different support structure. For example, the support structure of one or more annular tire modules may be constructed of a different material than the other annular tire modules. As another example, the geometry of the support structure of one or more annular tire modules may be different from the geometry of the other annular tire modules. In one specific example, one of the annular tire modules has spokes as a support structure, while the other annular tire modules have webbing.

The diameter and support structure of each annular tire module may be selected to tune the footprint and the performance of the tire. For example, it may be desirable for certain portions of a tire to have a higher stiffness than other portions. It may likewise be desirable for certain portions of a tire to have a greater diameter. Such factors may affect the performance of the assembled tire. The desired characteristics of an assembled tire may depend on other factors, such as the load on the tire and driving conditions, including temperature and precipitation. Thus a user may select tire modules and assemble a tire according to the desired characteristics of the resulting tire.

In the illustrated embodiment, the outer annular tire modules 710a and 710d have the same first circumferential tread pattern 750a, and the inner annular tire modules 710b, 710c have the same second circumferential tread pattern 750b. In this embodiment, the outer annular tire modules 710a and 710d are placed on the rim 400 such that the first circumferential tread patterns 750a are oriented in opposite orientations. In an alternative embodiment, the outer annular tire modules are placed on the rim such that the first circumferential tread patterns are oriented in the same direction. In other alternative embodiments, the tread patterns may be varied in any combination.

A plurality of spacer rings 760 are also disposed on the rim 400. Each spacer ring 760 includes a plurality of axial grooves 770 that define a plurality of axial ridges 780. The axial grooves 770 and axial ridges 780 of the spacer rings 760 are substantially the same as the axial grooves 720 and axial ridges 730 of the annular tire modules 710a, 710b, 710c, 710d, so that the spacer rings 760 can slide onto the rim 400 in the same manner as the annular tire modules 710a, 710b, 710c, 710d. The diameter of each spacer ring 760 is less than the diameter of each of the annular tire modules 710a, 710b, 710c, 710d.

In the illustrated embodiment, each spacer ring 760 has the same axial width. The spacer rings 760 are disposed between each pair of annular tire modules 710a, 710b, 710c, 710d such that each of the annular tire modules 710a, 710b, 710c, 710d is spaced from the nearest annular tire module. In an alternative embodiment, spacer rings of different axial widths may be employed. Additionally, spacer rings may be omitted between some annular tire modules, thus allowing the annular tire modules to contact each other. The number and width of the spacer rings may be selected to tune the performance of the assembled tire.

The tire and rim assembly 700 further includes a locking ring 790 that is disposed at the second axial end of the rim 400, opposite the flange 430 at the first axial end of the rim 400. The locking ring 790 includes a plurality of axial grooves 792 that define a plurality of axial ridges 794. The axial grooves 792 and axial ridges 794 of the locking ring 790 are substantially the same as the axial grooves 720 and axial ridges 730 of the annular tire modules 710a, 710b, 710c, 710d, so that the locking ring 790 can slide onto the rim 400 in the same manner as the annular tire modules 710a, 710b, 710c, 710d. The diameter of the locking ring 790 is less than the diameter of each of the annular tire modules 710a, 710b, 710c, 710d. The diameter of the locking ring 790 may be variable, such that the locking ring 790 can be tightened and remain fixed in place at the second axial end of the rim 400. Alternatively, the locking ring may be crimped, adhered, or otherwise bonded to the second axial end of the rim 400. Examples of bonding methods include brazing, welding, or chemical bonding. As another alternative, mechanical fasteners such as bolts or screws may extend through holes in the locking ring and engage with threaded holes in the rim to lock the locking rim in place.

The locking ring 790 may be fixed onto the second axial end of the rim 400 in a temporary or permanent manner. If the locking ring 790 is fixed to the second axial end of the rim 400 in a temporary manner, the tire and rim assembly 700 may be disassembled when desired. In such an embodiment, one or more of the tire modules and spacer rings may be replaced or rearranged, and the tire and rim assembly may then be assembled in a different orientation.

In embodiments where the rim does not include a flange at either end, two locking rings may be employed. A first locking rim is locked onto a first axial end of the rim and a second locking rim is locked onto a second axial end of the rim.

In the embodiments shown in FIGS. 4-7, all of the ridges and grooves on the outer surface of the rim and the inner surface of the annular tire modules, spacer rings, and locking ring extend in axial directions. In alternative embodiments (not shown), the ridges and grooves may be spiraled or helical shaped. Such grooves and ridges may be referred to as "rifled" grooves. The direction of the ridges and grooves of the rim, tire modules, spacer rings, and locking ring would correspond to each other, such that the tire modules, spacer rings, and locking ring may be twisted onto the rim.

As described above, a variety of different tread patterns may be employed on the tire modules. Each tread pattern may exhibit different performances under different conditions such as wet, dry, or snow conditions. The stiffness of each tread pattern may also differ. Thus, certain tread patterns may be more desirable for an end portion of a tire in certain conditions and other tread patterns may be more desirable for a central portion of a tire in certain conditions. FIGS. 8A-8C are partial front views of exemplary treads for annular tire modules. These examples a not intended to be limiting. It should be understood that the tread patterns may vary in any number of ways.

FIG. 8A illustrates one example of a solid rib tire tread 800a. The solid rib tire tread 800a includes a circumferential groove 810a that defines a first rib 820a and a second rib 830a. The first rib 820a has a first plurality of sipes 840a extending laterally across the entire first rib 820a. The second rib 830a has a second plurality of sipes 850a that partially extend into the second rib 830a in a lateral direction. Both of the first and second ribs 820a, 830a have linear sidewalls.

FIG. 8B illustrates one example of a hybrid rib tire tread 800b. The hybrid rib tire tread 800b includes a circumferential groove 810b that defines a first rib 820b and a second rib 830b. In the illustrated embodiment, the first rib 820b has a first plurality of sipes 840b partially extending into the first rib 820b in a lateral direction. The second rib 830b has a plurality of lateral grooves 850b that divide the second rib 830a into a plurality of blocks. Each block has a pair of zigzag sipes 860b that extend across the block in a lateral direction. Both of the first and second ribs 820b, 830b have non-linear sidewalls.

FIG. 8C illustrates one example of a blocked rib tire tread 800c. The blocked rib tire tread 800c includes a circumferential groove 810c that defines a first rib 820c and a second rib 830c. The circumferential groove 810c extends around the tread in a zigzag configuration. In the illustrated embodiment, the first rib 820c has a first plurality of lateral grooves 840c that divide the first rib 820c into a first plurality of blocks. Each of the first plurality of blocks has a pair of zigzag sipes 850c that extend across the block in a lateral direction. The second rib 830c has a plurality of lateral grooves 860c that divide the second rib 830c into a second plurality of blocks. Each of the second plurality of blocks has a pair of zigzag sipes 870c that extend across the block in a lateral direction. The first rib 820c has a non-linear sidewall, while the second rib 830c has a linear sidewall.

While each of the exemplary tread patterns shown in FIGS. 8A-8C illustrate a tread pattern having a single circumferential groove defining two ribs, it should be understood that any number of grooves and ribs may be employed. For example, it may be desirable to provide a wider tire module with three or more ribs. It also may be desirable to provide a narrower tire module with a single rib.

The tire modules and rims described herein are modular, such that they may be assembled in any number of desirable combinations. Using the three exemplary tread patterns provided in FIGS. 8A-8C, FIGS. 9-11 illustrate some of the different combinations that can be formed. The same nomenclature and reference numerals of FIGS. 8A-8C are used for convenience in FIGS. 9-11. It should be understood that the illustrated combinations are not limiting, and that any number of tread patterns can be assembled as any desirable combination.

Figure 9B:
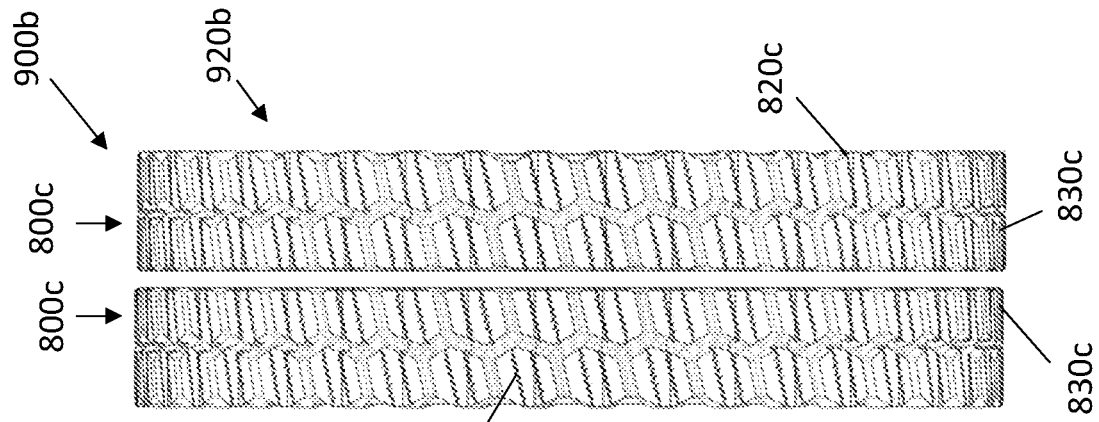
FIGS. 9A-9D are front views of exemplary non-pneumatic tires having two annular tire modules.
Figure 9A:
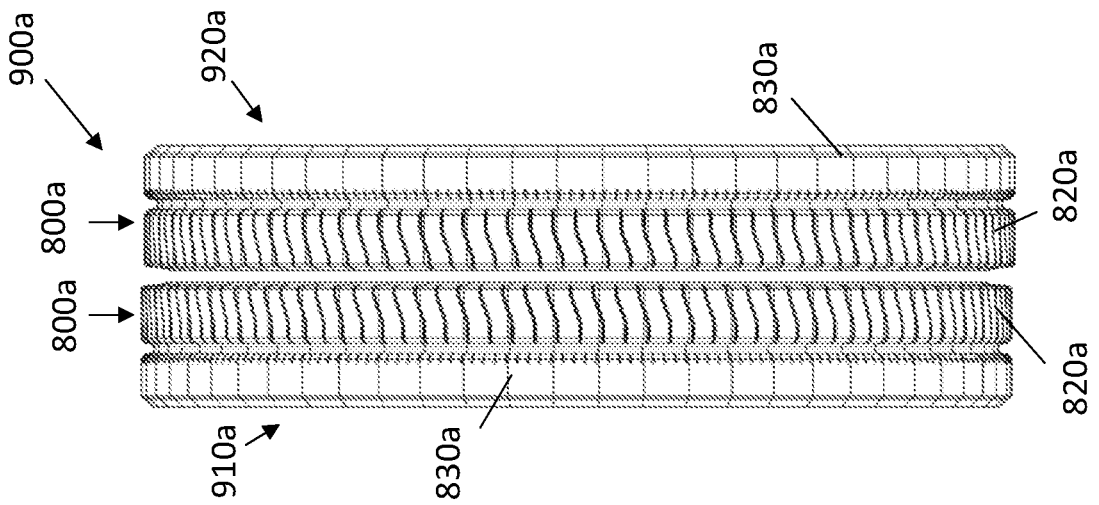

FIGS. 9A-9D are front views of exemplary non-pneumatic tires having two annular tire modules. FIG. 9A illustrates one embodiment of a non-pneumatic tire 900a that is constructed of first and second annular tire modules 910a and 920a, each of which has a solid rib tire tread 800a. The first and second annular tire modules 910a and 920a are spaced apart and in opposite orientations, such that the first rib 820a of the first annular tire module 910a is adjacent to the first rib 820a of the second annular tire module 920a. The second ribs 830a of the first and second annular tire modules 910a, 920a thus form the outer ribs of the non-pneumatic tire 900a. In alternative embodiments (not shown), the first and second annular tire modules are reversed such that the second rib of the first annular tire module is adjacent to the second rib of the second annular tire module, and the first ribs of the first and second annular tire modules form the outer ribs of the non-pneumatic tire. In another alternative embodiment, the first and second annular tire modules are oriented in the same direction.

FIG. 9B illustrates an alternative embodiment of a non-pneumatic tire 900b that is constructed of first and second annular tire modules 910b and 920b, each of which has a blocked rib tire tread 800c. The first and second annular tire modules 910b and 920b are spaced apart and in opposite orientations, such that the second rib 830c of the first annular tire module 910b is adjacent to the first rib 830c of the second annular tire module 920b. The first ribs 820c of the first and second annular tire modules 910b, 920b thus form the outer ribs of the non-pneumatic tire 900b. In alternative embodiments (not shown), the first and second annular tire modules are reversed such that the first rib of the first annular tire module is adjacent to the first rib of the second annular tire module, and the second ribs of the first and second annular tire modules form the outer ribs of the non-pneumatic tire. In another alternative embodiment, the first and second annular tire modules are oriented in the same direction.

Figure 9D:
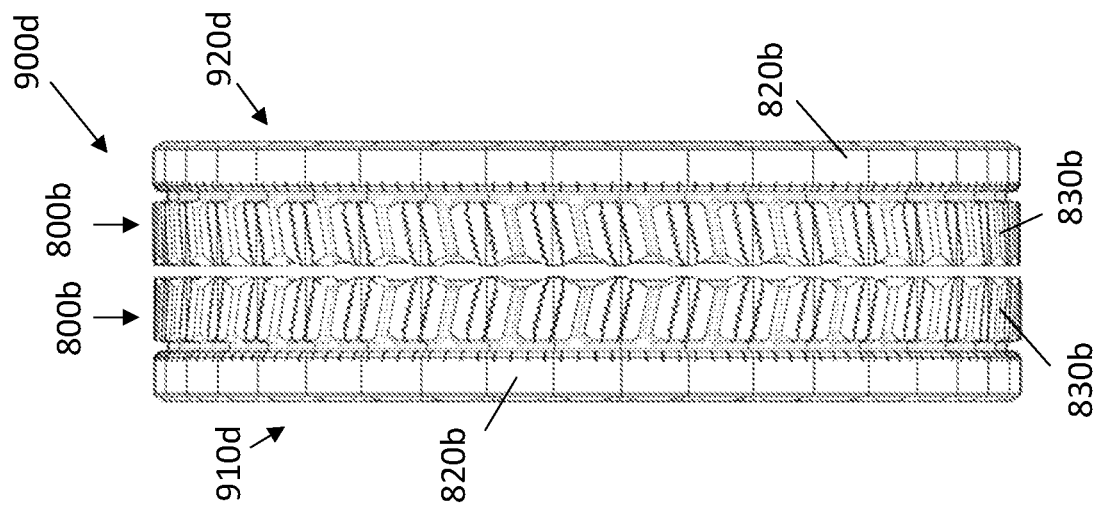
Figure 9C:
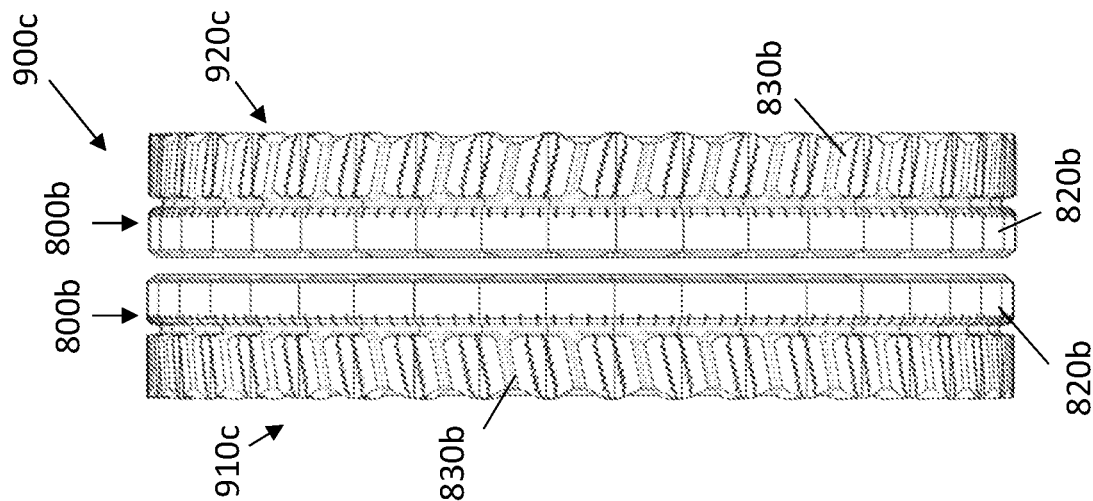

FIG. 9C illustrates another alternative embodiment of a non-pneumatic tire 900c that is constructed of first and second annular tire modules 910c and 920c, each of which has a hybrid rib tire tread 800b. The first and second annular tire modules 910c and 920c are spaced apart and in opposite orientations, such that the first rib 820b of the first annular tire module 910c is adjacent to the first rib 820b of the second annular tire module 920c. The second ribs 830b of the first and second annular tire modules 910c, 920c thus form the outer ribs of the non-pneumatic tire 900c. In another alternative embodiment, the first and second annular tire modules are oriented in the same direction.

FIG. 9D illustrates yet another alternative embodiment of a non-pneumatic tire 900d that is constructed of first and second annular tire modules 910d and 920d, each of which has a hybrid rib tire tread 800b. The first and second annular tire modules 910d and 920d are spaced apart and in opposite orientations, such that the second rib 830b of the first annular tire module 910d is adjacent to the second rib 830b of the second annular tire module 920d. The first ribs 820b of the first and second annular tire modules 910d, 920d thus form the outer ribs of the non-pneumatic tire 900d.

In still other alternative embodiments, an annular tire module having a solid rib tread may be used with an annular tire module having a blocked rib tread or a hybrid rib tread, in any orientation. Likewise, an annular tire module having a blocked rib tread may be used with an annular tire module having a hybrid rib tread in any orientation.

Figure 10C:
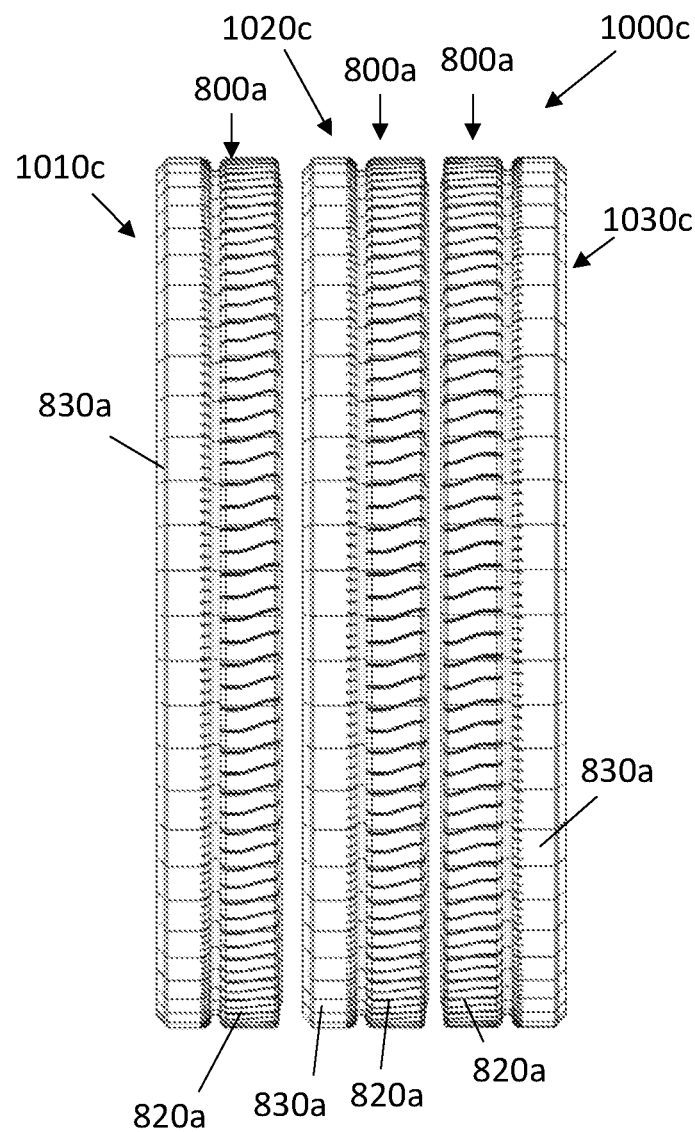

FIGS. 10A-10C are front views of exemplary non-pneumatic tires having three annular tire modules. FIG. 10A illustrates one embodiment of a non-pneumatic tire 1000*a* that is constructed of a first annular tire module 1010*a* having a hybrid rib tire tread 800*b*, a second annular tire module 1020*a* having a blocked rib tire tread 800*c*, and a third annular tire module 1030*a* having a hybrid rib tire tread 800*b*. The annular tire modules 1010*a*, 1020*a*, 1030*a* are spaced apart from each other.

The first annular tire module 1010*a* is oriented such that its first rib 820*b* forms an outer rib of the non-pneumatic tire 1000*a*. The second annular tire module 1020*a* is oriented such that its second rib 830*c* is adjacent to the second rib 830*b* of the first annular tire module 1010*a*. The third annular tire module 1030*a* is oriented such that its second rib 830*b* is adjacent to the first rib 820*c* of the second annular tire module 1020*a*. Thus, the first rib 820*b* of the third annular tire module 1030*a* forms an outer rib of the non-pneumatic tire 1000*a*. In alternative embodiments, the tire modules 1010*a*, 1020*a*, 1030*a* may be arranged in any order and any orientation.

FIG. 10B illustrates an alternative embodiment of a non-pneumatic tire 1000*b* that is constructed of a first annular tire module 1010*b* having a solid rib tire tread 800*a*, a second annular tire module 1020*b* having a blocked rib tire tread 800*c*, and a third annular tire module 1030*b* having a solid rib tire tread 800*a*. The annular tire modules 1010*b*, 1020*b*, 1030*b* are spaced apart from each other.

The first annular tire module 1010*b* is oriented such that its second rib 830*a* forms an outer rib of the non-pneumatic tire 1000*b*. The second annular tire module 1020*b* is oriented such that its first rib 820*c* is adjacent to the first rib 820*a* of the first annular tire module 1010*b*. The third annular tire module 1030*b* is oriented such that its first rib 820*a* is adjacent to the second rib 830*c* of the second annular tire module 1020*b*. Thus, the second rib 830*a* of the third annular tire module 1030*b* forms an outer rib of the non-pneumatic tire 1000*b*. In alternative embodiments, the tire modules 1010*b*, 1020*b*, 1030*b* may be arranged in any order and any orientation.

FIG. 10C illustrates another alternative embodiment of a non-pneumatic tire 1000*c* that is constructed of first, second, and third annular tire modules 1010*c*, 1020*c*, 1030*c*, each having a solid rib tire tread 800*a*. The annular tire modules 1010*c*, 1020*c*, 1030*c* are spaced apart from each other.

The first annular tire module 1010*c* is oriented such that its second rib 830*a* forms an outer rib of the non-pneumatic tire 1000*c*. The second annular tire module 1020*c* is oriented such that its second rib 830*a* is adjacent to the first rib 820*a* of the first annular tire module 1010*c*. The third annular tire module 1030*c* is oriented such that its first rib 820*a* is adjacent to the first rib 820*a* of the second annular tire module 1020*c*. Thus, the second rib 830*a* of the third annular tire module 1030*c* forms an outer rib of the non-pneumatic tire 1000*c*. In alternative embodiments, the tire modules 1010*c*, 1020*c*, 1030*c* may be arranged in any order and any orientation.

In still other alternative embodiments, three tire modules having any tread pattern may be arranged in any order and in any orientation.

Figure 11A:
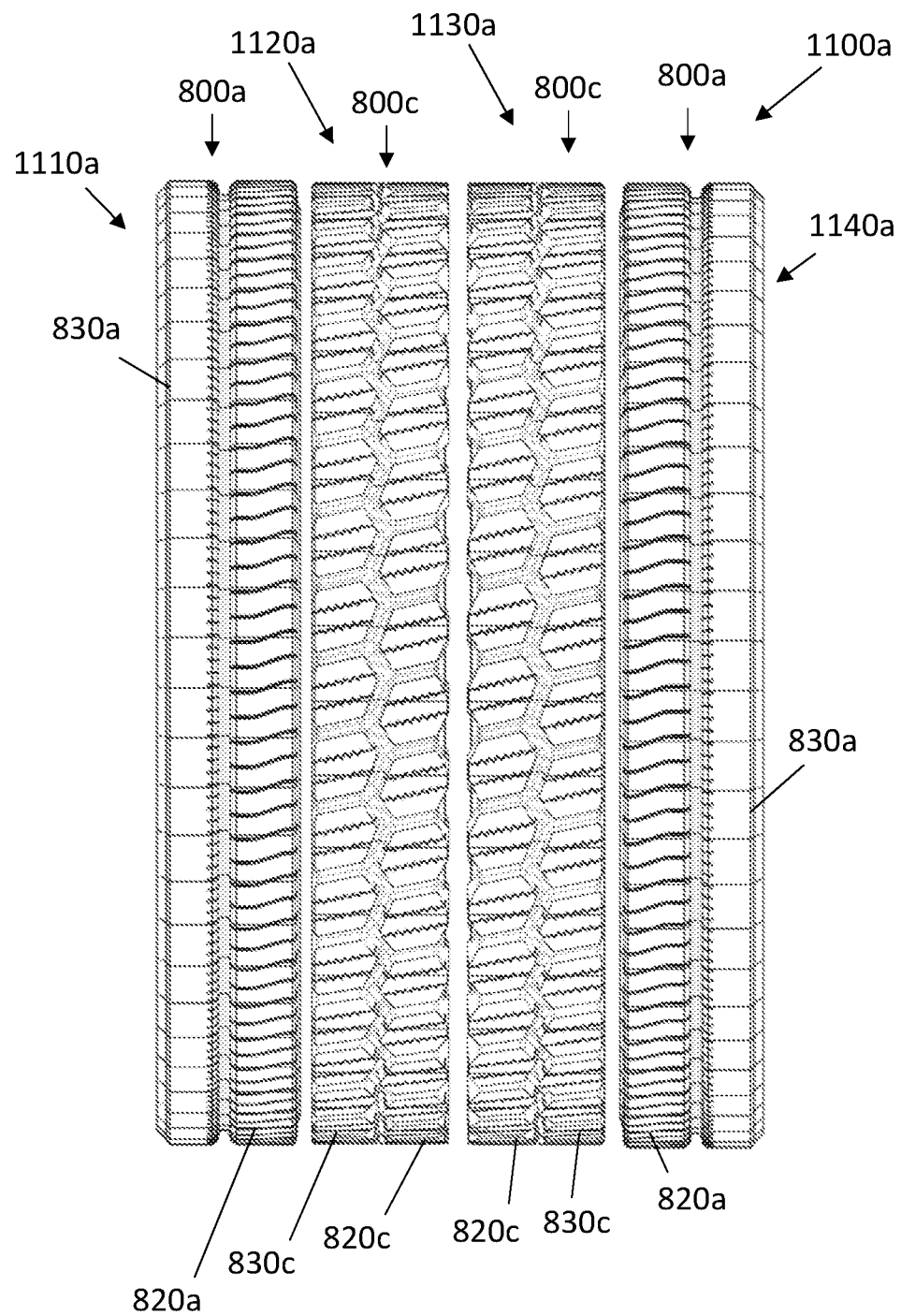
FIGS. 11A and 11B are front views of exemplary non-pneumatic tires having four annular tire modules.
Figure 11B:
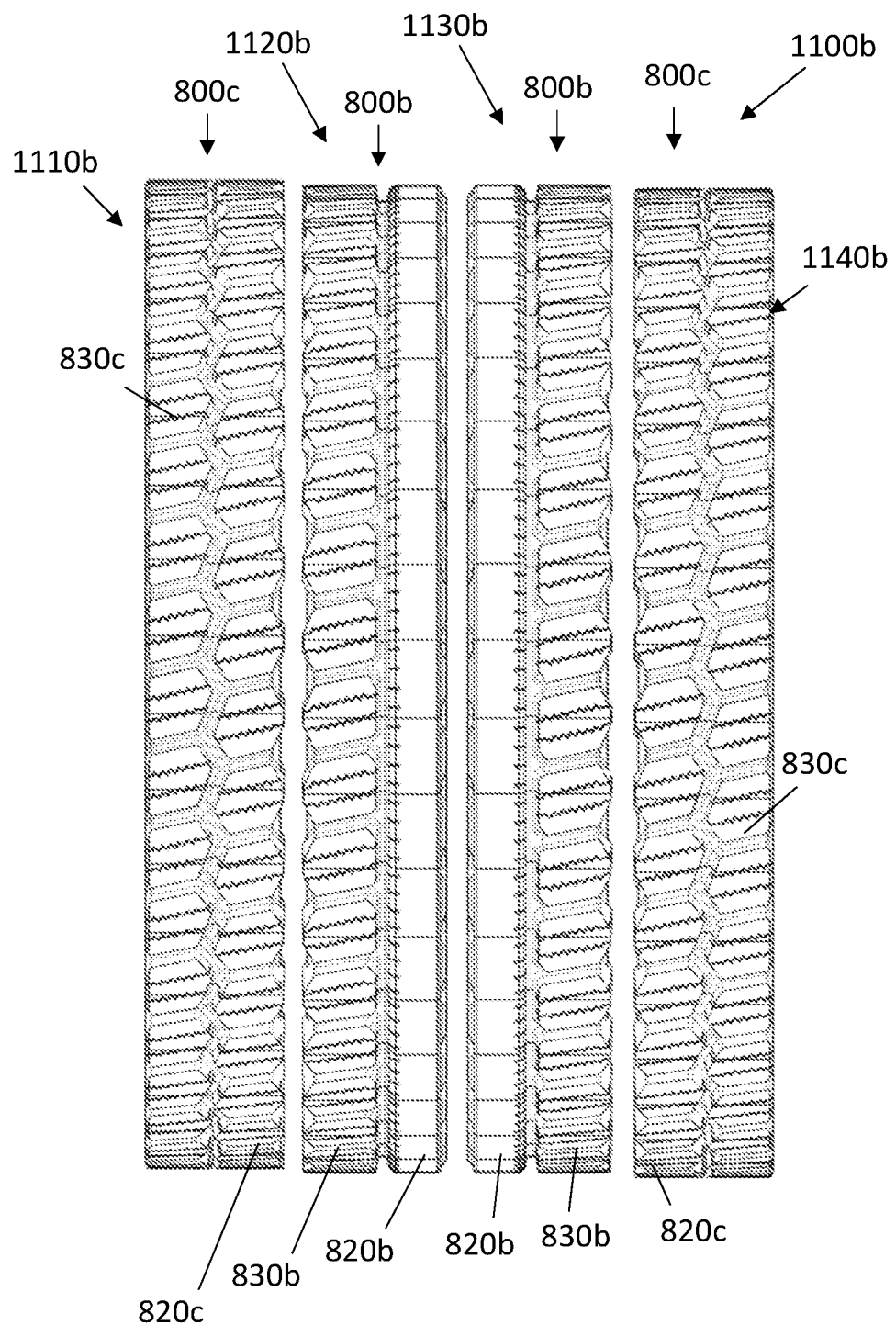

FIGS. 11A and 11B are front views of exemplary non-pneumatic tires having four annular tire modules. FIG. 11A illustrates one embodiment of a non-pneumatic tire 1100*a* that is constructed of a first annular tire module 1110*a* having a solid rib tire tread 800*a*, a second annular tire module 1120*a* having a blocked rib tire tread 800*c*, a third annular tire module 1130*a* having a blocked rib tire tread 800*c*, and a fourth annular tire module 1140*a* having a solid rib tire tread 800*a*. The annular tire modules 1110*a*, 1120*a*, 1130*a*, 1140*a* are spaced apart from each other.

The first annular tire module 1110*a* is oriented such that its second rib 830*a* forms an outer rib of the non-pneumatic tire 1100*a*. The second annular tire module 1120*a* is oriented such that its second rib 830*c* is adjacent to the first rib 820*a* of the first annular tire module 1110*a*. The third annular tire module 1130*a* is oriented such that its first rib 820*c* is adjacent to the first rib 820*c* of the second annular tire module 1120*a*. The fourth annular tire module 1140*a* is oriented such that its first rib 820*a* is adjacent to the second rib 830*c* of the third annular tire module 1130*a*. Thus, the second rib 830*a* of the fourth annular tire module 1140*a* forms an outer rib of the non-pneumatic tire 1100*a*. In alternative embodiments, the tire modules 1110*a*, 1120*a*, 1130*a*, 1140*a* may be arranged in any order and any orientation.

FIG. 11B illustrates an alternative embodiment of a non-pneumatic tire 1100*b* that is constructed of a first annular tire module 1110*b* having a blocked rib tire tread 800*c*, a second annular tire module 1120*b* having a hybrid rib tire tread 800*b*, a third annular tire module 1130*b* having a hybrid rib tire tread 800*b*, and a fourth annular tire module 1140*b* having a blocked rib tire tread 800*c*. The annular tire modules 1110*b*, 1120*b*, 1130*b*, 1140*b* are spaced apart from each other.

The first annular tire module 1110*b* is oriented such that its second rib 830*c* forms an outer rib of the non-pneumatic tire 1100*b*. The second annular tire module 1120*b* is oriented such that its second rib 830*b* is adjacent to the first rib 820*c* of the first annular tire module 1110*b*. The third annular tire module 1130*b* is oriented such that its first rib 820*b* is adjacent to the first rib 820*b* of the second annular tire module 1120*b*. The fourth annular tire module 1140*b* is oriented such that its first rib 820*c* is adjacent to the second rib 830*b* of the third annular tire module 1130*b*. Thus, the second rib 830*c* of the fourth annular tire module 1140*b* forms an outer rib of the non-pneumatic tire 1100*b*. In alternative embodiments, the tire modules 1110*b*, 1120*b*, 1130*b*, 1140*b* may be arranged in any order and any orientation.

In still other alternative embodiments, four tire modules having any tread pattern may be arranged in any order and in any orientation.

To assemble a non-pneumatic tire and rim using the principles discussed herein, a user is provided a plurality of annular tire modules. Each annular tire module has an inner ring, an outer ring, support structure extending between the inner ring and the outer ring, and a circumferential tread extending about the outer ring. The user is also provided a rim.

As discussed above, the circumferential tread of the first annular tire module may be an asymmetrical tread. Likewise, the circumferential tread of the second annular tire module may be an asymmetrical tread.

The user then selects a first annular tire module from the plurality of annular tire modules. The user may select an orientation of the first annular tire module and slide the first annular tire module onto the rim while the first annular tire module is in the selected orientation. The user then selects a second annular tire module from the plurality of annular tire modules. The user may select an orientation of the second annular tire module and slide the second annular tire module onto the rim while the second annular tire module is in the selected orientation. The user is also provided a locking ring, and slides the locking ring onto the rim.

In one embodiment, the user is provided a spacer ring. In such an embodiment, the user slides the spacer ring onto the rim. The user may slide the spacer ring onto the rim after sliding the first annular tire module onto the rim, but before sliding the second annular tire module onto the rim. Alternatively, the user may slide the spacer ring onto the rim after sliding the second annular tire modules onto the rim.

As should be understood from the disclosure above, certain steps of this method may be repeated, to build a tire and rim assembly having three or more annular tire modules or two or more spacer rings.

After the tire and rim assembly has been assembled, a user may wish to disassemble the tire and rim assembly. For example, a user may desire to perform maintenance on one or more of the components, or replace one or more of the components. The user may also wish to replace all of the annular tire modules. To disassemble the tire and rim assembly, a user removes the locking ring from the rim, and remove the second annular tire module from the rim, and removes the first annular tire module from the rim. If spacer rings have been placed on the rim, they are also removed from the rim. If any additional annular tire modules have been placed on the rim, they are also removed from the rim.

After the tire and rim assembly has been disassembled, a user may wish to build a different tire and rim assembly. In such instances, the user selects a third annular tire module from the plurality of annular tire modules and slides the third annular tire module onto the rim. The user also selects a fourth annular tire module from the plurality of annular tire modules and slides the fourth annular tire module onto the rim. As with the initial assembly, the user may select the orientation of the third and fourth annular tire modules before sliding them onto the rim. The user may also slid spacer rings and any additional annular tire modules onto the rim. The user then slides the locking ring onto the rim.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A non-pneumatic tire and rim assembly comprising:
   a non-pneumatic tire having a plurality of annular tire modules, including a first annular tire module coaxial with a second annular tire module,
      wherein the first annular tire module includes a first inner ring, a first outer ring, first support structure extending between the first inner ring and the first outer ring, and a first circumferential tread extending about the first outer ring,
      wherein an inner surface of the first inner ring has a first plurality of axial grooves that define a first plurality of axial ridges,
      wherein the second annular tire module includes a second inner ring, a second outer ring, second support structure extending between the second inner ring and the second outer ring, and a second circumferential tread extending about the second outer ring,
      wherein an inner surface of the second inner ring has a second plurality of axial grooves that define a second plurality of axial ridges, and
      wherein the first circumferential tread has a first tread pattern and the second circumferential tread has a second tread pattern that is different from the first tread pattern; and
   a rim having an outer annular surface that engages the first inner ring and the second inner ring,
      wherein the outer annular surface of the rim has a third plurality of axial grooves that define a third plurality of axial ridges,
      wherein the third plurality of axial grooves have a cross-sectional geometry corresponding to a cross-sectional geometry of the first plurality of axial ridges and to a cross-sectional geometry of the second plurality of axial ridges, and
      wherein the third plurality of axial ridges have a cross-sectional geometry corresponding to a cross-sectional geometry of the first plurality of axial grooves and to a cross-sectional geometry of the second plurality of axial grooves.

2. The non-pneumatic tire and rim assembly of claim 1, wherein the first annular tire module has a first diameter and the second annular tire module has a second diameter substantially equal to the first diameter.

3. The non-pneumatic tire and rim assembly of claim 1, wherein the first annular tire module contacts the second annular tire module.

4. The non-pneumatic tire and rim assembly of claim 1, wherein the first annular tire module is axially spaced from the second annular tire module.

5. The non-pneumatic tire and rim assembly of claim 4, further comprising a spacer ring engaging the rim,
   wherein the spacer ring is disposed between the first annular tire module and the second annular tire module,
   wherein the first annular tire module has a first diameter,
   wherein the second annular tire module has a second diameter substantially equal to the first diameter, and
   wherein the spacer ring has a third diameter that is less than the first diameter and less than the second diameter.

6. The non-pneumatic tire and rim assembly of claim 1, wherein the plurality of annular tire modules further includes a third annular tire module having a third inner ring, a third outer ring, third support structure extending between the third inner ring and the third outer ring, and a third circumferential tread extending about the third outer ring.

7. The non-pneumatic tire and rim assembly of claim 1, wherein the rim has a flange at a first axial end.

8. The non-pneumatic tire and rim assembly of claim 7, further comprising a locking ring that engages a second axial end of the rim, such that the first annular tire module and the second annular tire module are disposed between the flange and the locking ring.

9. A non-pneumatic tire and rim assembly comprising:
a non-pneumatic tire having a plurality of annular tire modules, including a first annular tire module coaxial with a second annular tire module,
wherein the first annular tire module includes a first inner ring, a first outer ring, first support structure extending between the first inner ring and the first outer ring, and a first circumferential tread extending about the first outer ring,
wherein the second annular tire module includes a second inner ring, a second outer ring, second support structure extending between the second inner ring and the second outer ring, and a second circumferential tread extending about the second outer ring,
wherein the first circumferential tread has a first tread pattern and the second circumferential tread has a second tread pattern that is different from the first tread pattern;
a rim having an outer annular surface that engages the first inner ring and the second inner ring; and
a spacer ring engaging the rim,
wherein the spacer ring is disposed between the first annular tire module and the second annular tire module, such that the first annular tire module is axially spaced from the second annular tire module,
wherein the first annular tire module has a first diameter,
wherein the second annular tire module has a second diameter substantially equal to the first diameter, and
wherein the spacer ring has a third diameter that is less than the first diameter and less than the second diameter.

10. The non-pneumatic tire and rim assembly of claim 9,
wherein an inner surface of the first inner ring has a first plurality of axial grooves that define a first plurality of axial ridges,
wherein an inner surface of the second inner ring has a second plurality of axial grooves that define a second plurality of axial ridges,
wherein the outer annular surface of the rim has a third plurality of axial grooves that define a third plurality of axial ridges,
wherein the third plurality of axial grooves have a cross-sectional geometry corresponding to a cross-sectional geometry of the first plurality of axial ridges and to a cross-sectional geometry of the second plurality of axial ridges, and
wherein the third plurality of axial ridges have a cross-sectional geometry corresponding to a cross-sectional geometry of the first plurality of axial grooves and to a cross-sectional geometry of the second plurality of axial grooves.

11. The non-pneumatic tire and rim assembly of claim 9, wherein the outer annular surface of the rim is a smooth surface.

12. The non-pneumatic tire and rim assembly of claim 9, wherein the plurality of annular tire modules further includes a third annular tire module having a third inner ring, a third outer ring, third support structure extending between the third inner ring and the third outer ring, and a third circumferential tread extending about the third outer ring.

13. The non-pneumatic tire and rim assembly of claim 9, wherein the rim has a flange at a first axial end.

14. The non-pneumatic tire and rim assembly of claim 13, further comprising a locking ring that engages a second axial end of the rim, such that the first annular tire module and the second annular tire module are disposed between the flange and the locking ring.

* * * * *